Jan. 16, 1962   H. J. WOLBERT   3,017,512
COATING THICKNESS GAUGE
Filed June 29, 1959
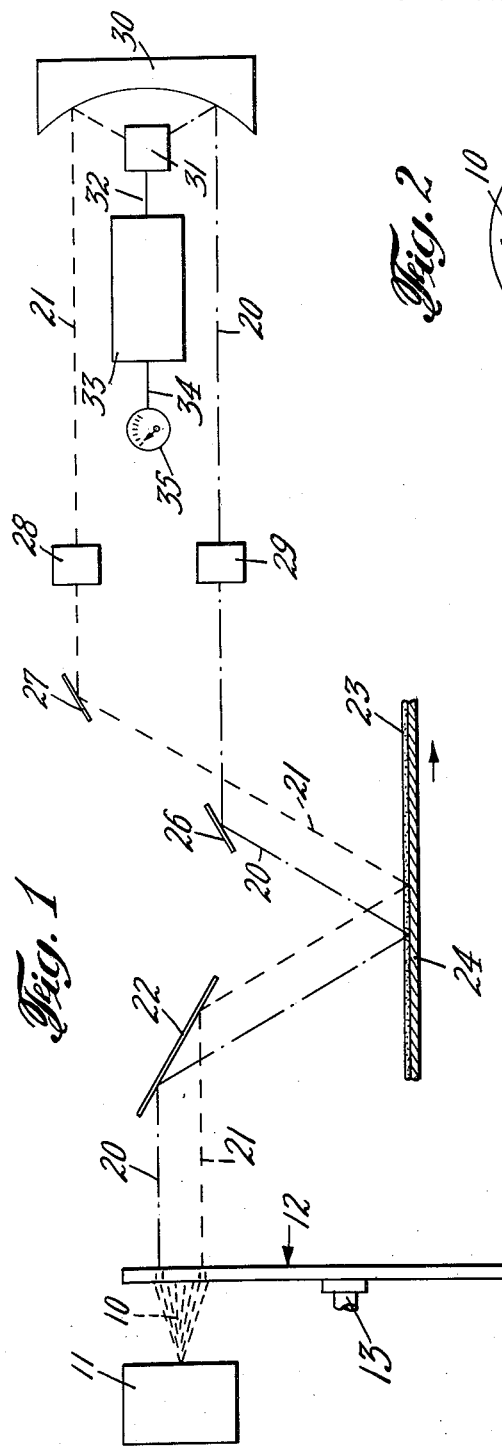
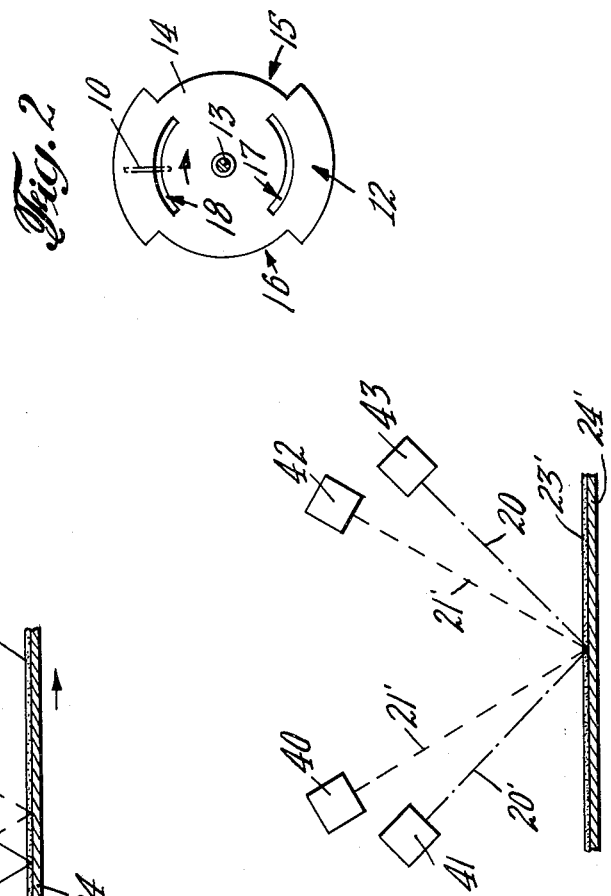
INVENTOR.
HARRIS JAY WOLBERT
BY
Robert P. Auber
George W. Reiber
ATTORNEY

United States Patent Office 3,017,512
Patented Jan. 16, 1962

---

3,017,512
COATING THICKNESS GAUGE
Harris Jay Wolbert, Prospect Heights, Ill., assignor to American Can Company, New York, N.Y., a corporation of New Jersey
Filed June 29, 1959, Ser. No. 823,583
3 Claims. (Cl. 250—83.3)

The instant invention pertains to a method of determining the thickness of a film on a substrate and an apparatus therefor. In particular, the invention relates to an optical method and apparatus for determining the thickness of a thin film of organic material either wet or dry overlying an opaque but reflective substrate.

The instant invention will be described in relation to organic coatings applied to tin plate for utilization in metal container manufacture. However, it is to be understood that the instant invention has broader aspects and may be utilized in the measurement of other types of films existing on various types of substrates by modifications of the method and apparatus described herein readily apparent to those skilled in the art.

A great number of sheet metal cans, so-called tin cans, have applied to one or more of their surfaces a protective coating, usually an organic resin film. To perform their functions adequately as protective barriers, it is necessary that these films have a certain critical minimum thickness. To insure the existence of this minimum thickness, it is common practice to apply a coating in its wet state in greater than necessary amounts as a sort of safety factor. Obviously, the application of this excess coating is uneconomical, and leads to fabrication difficulties.

Various gauges for accurately measuring the organic coating applied to a metal substrate have been considered. However, to be truly effective, the coating thickness gauge must be capable of measuring the coating immediately after application, while it is still wet, so that immediate alterations in the coating operation can be made to vary the coating thickness if necessary. Since the coating is not in a dry, handleable state for about 10 minutes after its initial application, measurements at this point would permit the production of considerable improperly coated plate prior to detection thereof. Further, any accurate measurement of a wet, mobile, fluid coating must omit physical contact between the measurement device and the coating. Also, to insure no interruption in production, the measurement should be made while the coated sheet is moving.

It is therefore an object of the present invention to provide a method of continuously measuring the thickness of a wet or dry coating carried on a moving substrate.

Another object is to provide a method of the character described where no physical contact occurs, whereby this method is well suited to the measurement of mobile fluid films.

Another object is to provide a method of measuring heat hardenable organic coatings on a metal substrate between the time of coating application and the heat hardening thereof.

Still a further object is to provide a method of measuring very thin films which is rapid, efficient and economical.

It is also an object of the instant invention to provide an apparatus for carrying out the method of the instant invention.

Numerous other objects and advantages of the invention will be apparent as it is better understood from the following description, which, taken in connection with the accompanying drawings, disclosed a preferred embodiment thereof.

The above objectives are accomplished by passing infrared radiation through a film or coating carried on a reflective surface of an opaque substrate, reflecting this incident radiation from the surface and out through the coating, selecting from the emitted infrared radiation a beam of light, a portion of the energy of which is absorbed by the coating due to the chemical structure thereof, and another beam of the emitted radiation whose wave length is such that none of its energy is absorbed by the coating, passing these beams alternately into a detector to determine the differences in intensity in each, and transmitting this information to the operator of the coating apparatus whereby any adjustments necessary in the apparatus may be effected, if necessary.

FIG. 1 is a schematic side elevational view of the optical apparatus for the measuring of coating thickness;

FIG. 2 is a plan view of the light interrupter; and

FIG. 3 is a schematic side elevational view of a modified form of the optical, thickness gauge.

Throughout the following specification and claims, one of two beams of infrared radiation will be referred to as the reference beam, and the other will be called the sample beam. By reference beam is meant that beam of infrared radiation which has a wavelength such that the beam may pass through the coating without being absorbed by the coating; and by sample beam is meant that beam of infrared radiation which has a wavelength such that a portion of its energy is absorbed by the coating.

The instant invention for determining organic coating thickness makes use of the relationship, noted by Beer and Lambert, between the absorption of radiant energy and the amount of absorptive material in the path of the radiant energy. This relationship can be stated simply as:

$$\log \frac{I_0}{I} = kcd$$

where:

$I_0$ is the intensity of the reference beam striking the detector $I$ is the intensity of the sample beam striking the detector $k$ is a constant $c$ is the concentration of absorptive material in the sample $d$ is the thickness of the sample.

This relationship is used mostly in determining the concentration of a certain substance in a sample by transmitting light through the sample of known thickness. I have now discovered that this relationship is equally effective in determining the thickness of a mobile, liquid film on an opaque but reflective substrate by passing the radiation into the coating and out again by reflecting the radiation from the substrate. It is apparent that the instant method relies on reflection rather than transmission for its effectiveness. It has been found that there is a direct relationship between the thickness of a sample film and the difference between $I_0$ and $I$. This obviates, in commercial practice the need to determine $I_0$ and $I$ separately and calculate $d$. As described more fully hereinafter, a device determines the difference between $I_0$ and $I$ from which calibration curves may then be obtained; or, as is more usual in commercial practice, the difference between $I_0$ and $I$ may be shown on a visual inspection device calibrated to read directly in sample thickness $d$.

Infrared light is particularly applicable to the method because substantially all organic compounds will absorb infrared radiation at specific frequencies within this range. The specific frequency or wave length at which the radiant energy is absorbed is a characteristic of structure of the compound. The amount of radiant energy absorbed by the organic chemical is directly related to the quantity of absorbing chemicals in the path of the radiation. When the concentration of the sample is maintained at a known, constant level, the instant method permits highly accurate thickness measurements to be made of the particular samples.

The coatings or films being measured must be transparent to, i.e. transmit some infrared radiation. Coatings utilized in container manufacture, such as inorganic phosphate and chromate coatings and organic coatings such as vinyl resins, oleoresinous varnishes, epoxide resins and phenolic resins, as well as the solvents for these materials have this property. Surprisingly it has been found that the thickness of coatings containing pigments opaque to visible light, such as titanium dioxide and zinc oxide, can be measured by the instant invention. Either solvent evaporation is uniform or very little or no solvent evaporates between application of the coating and thickness measurement thereby maintaining the concentration of absorbing materials constant. Accurate correlation between thickness measurements obtained by the instant invention and other precise but cumbersome methods corroborates this fact.

For the proper operation of the instant invention only two beams of monochromatic light may strike the detector. By monochromatic light is meant light having a substantially single wave length. One of these beams of light is the reference beam and the other is the sample beam. These two beams of light must travel through the sample as close to one another as possible. This proximity in their travel through the sample has the effect of cancelling out errors due to variations in the surface of the coating to be measured and in the reflective surface substrate immediately therebeneath.

Any wave length may be selected for the reference beam and sample beam provided that the energy of the reference beam is unattenuated or unabsorbed by its passage through the coating; and that a portion of the energy of the sample beam is absorbed by the coating. The structure of the particular chemical ingredients in the coating will determine the operable wave length for the reference beam and the sample beam. For example, a coating composition in which there are ingredients having ether linkages will absorb infrared radiation of from 8 to 9 micron wave length; epoxide groups will absorb infrared radiation of from 6.62 to 6.66 microns wave length; a chemical having carbonyl groups will absorb light having a wave length of about 5.7 to 6.0 microns. Further, because of the carbon to hydrogen linkage present, almost all organic compounds will absorb infrared radiation having a wave length of from 3.3 to 3.5 microns. Any of these wave lengths could be used for the sample beam; or, on the other hand, the 8 to 9 micron wave length could be used in the reference beam if no ingredients absorbing at this wave length such as an ether group, were present in the sample. Radiation having a wave length of from 4 to 5.5 microns is well suited for use in the reference beam when measuring organic coatings since the chemical groupings absorbing light of this wave length, e.g. carbon dioxide and the nitrile group, are rarely found in organic coating materials.

FIG. 1 illustrates the preferred or exemplary embodiment of the instant invention. Polychromatic infrared radiation 10 emanates from a source such as an uncovered, electrically heated, platinum-rhodium winding installed in a polished cylindrical housing 11 of stainless steel having a properly located opening to direct the radiation into the desired channel. Although fluctuations in source intensity are automatically compensated for by having a single source for both the reference and sample beams, an effort is made to have emission stability by maintaining the source temperature at 1,000° C. by a constant voltage transformer.

The radiation 10 strikes an interrupter or chopper generally designated 12, rotated at a constant speed on a shaft 13 by a suitable source of motive power not shown. The chopper 12 comprises a disc 14 (FIG. 2) which has diametrically opposed portions of its periphery removed to form notches 15 and 16, each notch equal to ¼ of the periphery of the disc 14. Adjacent its unnotched periphery, disc 14 has arcuate slots 17, 18. By rotating at a constant velocity in the path of the emitted radiation 10, the chopper 12 breaks this emitted radiation into two separate beams, the beam 20 and the beam 21 which after optical filtration more fully described hereinafter, will become the reference beam and sample beam respectively. One beam is permitted to pass the chopper 12 by virtue of the notches 15, 16; whereas the other beam is transmitted through the slots 17, 18, transmission of each beam taking place intermittently and alternately.

The two beams 20, 21 traveling in parallel paths, strike an angularly disposed mirror 22 and are reflected downwardly toward a coating 23 to be measured carried on the reflective surface of a moving sheet metal substrate 24. Each beam 20, 21 passes through the coating 23, strikes the reflective surface and is reflected upwardly out of the coating. As mentioned previously, to minimize errors introduced by variations in the coating and substrate at spaced points, the two beams strike the coating and surface as close together as possible. FIG. 1 shows the two beams somewhat spaced mainly for clarity of illustration and understanding. In actuality the two beams would be contiguous. It is also to be understood that any loss of radiation intensity caused by diffusion of the beams upon striking any of the mirrors or the coating or substrate will occur equally in both the beams 20, 21, thereby compensating for any error introduced by such diffusion.

Although the instant method can be used statically, i.e. no relative motion between the beams and the coating, it is preferred to utilize the invention dynamically, i.e. wherein there is relative motion between the beams and the coated substrate. Such relative motion permits continuous, high speed, monitoring of coatings with no interruption in production. In the preferred embodiment illustrated, the beams are stationary while the substrate moves in the direction of the arrow. It should be understood that the present invention contemplates movement of both the substrate and the beams whereby the coated substrate is scanned in two dimensions, longitudinally and transversely.

It is also necessary to the operability of the instant method that the reflecting surface of the substrate 24 be essentially flat or uniplanar. This may be accomplished by passing the substrate 24 over a rigid flat support (not shown) under which are mounted a plurality of magnets (not shown) to hold at least the reflecting surface of the substrate flat against the support.

Since the instant method involves passage of the radiant energy through the unknown twice, i.e. upon incidence and after reflectance, uncompensated errors will be introduced due to refraction of the beams upon each passage through the unknown coating or sample. However, I have found that, when measuring film thickness in order of magnitude in the present invention, i.e. .05 to 1 mil, these errors are substantially negligible and can be ignored.

After their reflectance from the surface of the substrate 24 and their second passage through the coating 23, beam 20 and beam 21 strike angularly disposed mirrors 26 and 27 respectively; and are reflected through optical filters 28 and 29 respectively. It is to be understood that a single mirror can be used in place of the two mirrors 26, 27 if desired. The optical filters 28 and 29 remove from each beam all radiant energy of a wave length other than that desired, making each beam monochromatic and transforming them into reference beam 20 and sample beam 21. In actual operation, a reference beam of 4.0 micron wave length and a sample beam of 3.45 micron wave length are used. No coating presently utilized in container manufacture absorbs radiant energy having a wave length of 4.0 microns. As pointed out previously, infrared radiation having a wave length of from 3.3 to 3.5 microns is absorbed by an ingredient having carbon to hydrogen bonds.

Reference beam 20 and sample beam 21 strike a concave mirror 30 and are reflected intermittently into a detector 31. The detector is a single pin thermocouple which generates a small current according to the intensity of the infrared radiation of the reference beam 20 and the sample beam 21 striking it. The beams must strike the thermocouple detector one at a time and alternately. It is apparent that this intermittent, alternate passage of the reference and sample beams is accomplished by the chopper 12, which also breaks the intermittent light into substantially single parallel beams.

The current generated by the detector thermocouple is passed, such as by a wire 32, through an amplifier 33, whereupon it is magnified to a conveniently useable level and thereafter transmitted, such as by a wire 34, to a suitable visual inspection device such as the meter 35. It is to be understood that the visual inspection device may take forms other than a meter 35, such as a graph recorder. It is also considered within the purview of the instant invention that the signal developed in the amplifier 33 may be passed through a suitable servo mechanism to activate an automatic adjustment of the coating applying device.

FIG. 3 illustrates a modified form of the instant invention. In this modification a monochromatic reference beam 20' and a monochromatic sample beam 21' emanate from separate sources 40, 41, respectively, and travel in non-parallel, convergent paths. Such an arrangement obviates the need for the chopper 12. The converging beams pass through the coating 23' and strike the reflective surface of the moving substrate 24' at substantially the same point and are thereafter reflected on divergent paths out through the coating into a pair of detectors 42, 43. As illustrated, reference beam 20 enters detector 42 and sample beam 21 enters detector 43. The impulse from each detector is transmitted into a single amplifier whereupon the remainder of the operation and apparatus is as illustrated in FIG. 1. Since the emitted infrared radiation is monochromatic, there is no need for the optical filters. With this modified arrangement care must be taken to insure equal intensity for each source 40, 41. Also, the separate detectors must be carefully balanced so that the electrical impulse transmitted by each into an amplifier and thence to a visible inspection device must reflect exactly the intensity of the detected radiant energy and introduce no extraneous error.

Another modified form (not shown) contemplated within the scope of the present invention involves directing the parallel beams 20, 21, emitted from a single source 10 as in FIG. 1, directly towards the coating 23 without reflecting the beams from a mirror such as 22. This is accomplished merely by tilting the housing 11 and chopper 12 toward the coating. Using a similar angular arrangement, the beams 20, 21 after their reflection from the surface of substrate 24, may be passed directly through the filters 28, 29 to the concave mirror 30 and into detector 31 without using the mirrors 26, 27.

It is thought that the invention and many of its attendant advantages will be understood from the foregoing description, and it will be apparent that various changes may be made in the form, construction and arrangement of parts of the apparatus mentioned herein and in the steps and their order of accomplishment of the method described herein, without departing from the spirit and scope of the invention or sacrificing all of its material advantages, the apparatus and process hereinbefore described being merely a preferred embodiment thereof.

I claim:

1. An apparatus for measuring the thickness of a thin film of a chemical substance carried on a reflective surface of a moving opaque substrate comprising means for moving said surface along a predetermined path, radiation means for emitting infrared light, means for directing a pair of beams of said light through said film and onto closely adjacent points on said surface from which said beams are reflected, means for maintaining said surface essentially uniplanar during reflection of said beams, and sensing means in the path of said reflected beams to sense alternately the intensity of each reflected beam, means to cause each of said reflected beams striking said sensing means to be composed of infrared light of a substantially single but different wave length, one of said reflected beams having a wave length such that a portion of its energy is absorbed by said film, and the other of said reflected beams having a wave length such that essentially none of its energy is absorbed by said film whereby the intensity of each reflected beam being sensed is different.

2. An apparatus for measuring the thickness of a thin film comprising an organic substance carried on a reflective surface of a moving metal sheet comprising means for moving said sheet along a predetermined path of travel over a rigid, essentially flat support, radiation means for emitting polychromatic infrared light, means for reducing the emitted light to two parallel beams, first mirror means angularly disposed to the path of said light beams to direct said beams through said film and onto closely adjacent points on said moving surface from which said beams are reflected, magnet means associated with said support to maintain said surface essentially uniplanar during reflection of said beams, second mirror means disposed on the same side of said sheet as said first mirror means to direct the reflected beams along a new path of travel, an optical filter mounted in the path of travel of each beam adapted to reduce each beam to essentially a single but different wave length, the wave length of one of said filtered beams being such that a portion of the energy of infrared light having this wave length is absorbed by the organic substance of said film, and the wave length of the other of said beams being such that essentially none of the energy of infrared light having this wave length is absorbed by the organic substance of said film, sensing means in the path of said filtered beams to sense alternately the intensity of each beam, and visual inspection means to receive and display the difference in the sensed intensity.

3. An apparatus for measuring the thickness of a thin film comprising an organic substance carried on a reflective surface of a moving metal sheet comprising means for moving said sheet along a predetermined path of travel over a rigid essentially flat support, a pair of radiation means for emitting a pair of substantially monochromatic infrared light beams along a convergent path through said film onto substantially a single point on said surface from which said beams are reflected in a divergent path, the wave length of each beam being different and such that said film reduces the intensity of one beam but does not reduce the intensity of the other beam, magnet means associated with said support to maintain said surface essentially uniplanar during reflection of said beams, sensing means in the path of each beam to sense alternately the intensity of each beam, and visual inspection means to receive and display the difference in the sensed intensity.

References Cited in the file of this patent

UNITED STATES PATENTS

| 2,393,631 | Harrison | Jan. 29, 1946 |
| 2,897,371 | Hasler | July 28, 1959 |